(12) United States Patent
Okumura et al.

(10) Patent No.: US 6,414,995 B2
(45) Date of Patent: Jul. 2, 2002

(54) MOTION VECTOR DETECTION SYSTEM

(75) Inventors: Seiji Okumura; Yoshiko Hatano, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/771,550

(22) Filed: Jan. 30, 2001

Related U.S. Application Data

(63) Continuation of application No. PCT/JP99/04063, filed on Jul. 29, 1999.

(51) Int. Cl.[7] .................................. H04N 7/12
(52) U.S. Cl. .................... 375/240.16; 348/699
(58) Field of Search .................. 348/699, 700, 348/402.1, 394.1, 407.1, 413.1, 414.1, 416.1; 375/409.1, 240.12, 240.16, 240.02; H04N 7/12

(56) References Cited

U.S. PATENT DOCUMENTS

| | | | | |
|---|---|---|---|---|
| 5,428,403 A | * | 6/1995 | Andrew et al. | 348/699 |
| 5,537,155 A | * | 7/1996 | O'Connell et al. | 348/699 |
| 6,091,460 A | * | 7/2000 | Hatano et al. | 348/699 |
| 6,195,389 B1 | * | 2/2001 | Rodriguez et al. | 375/240.16 |

FOREIGN PATENT DOCUMENTS

| | | |
|---|---|---|
| JP | 4150284 | 5/1922 |
| JP | 4298184 | 10/1992 |
| JP | 5328333 | 12/1993 |
| JP | 07107484 | 4/1995 |
| JP | 089379 | 1/1996 |
| JP | 08032969 | 2/1996 |
| JP | 09055941 | 2/1997 |
| JP | 09065339 | 2/1997 |
| JP | 970046 | 3/1997 |
| JP | 104554 | 1/1998 |

* cited by examiner

*Primary Examiner*—Nhon T Diep

(57) ABSTRACT

The present invention relates to a motion vector detection method and system for detecting a motion vector for motion compensation in moving picture compression. The motion vector detection system reduces the amount of operations without degrading the quality of an image. A vector memory stores a motion vector having been obtained. A predicted motion vector calculator predicts the motion vector of a block to be predicted based upon the motion vector of a block adjacent to the block to be predicted. The search range determiner determines a search range based upon the motion vector predicted. The motion vector detector performs block matching within the search range.

14 Claims, 6 Drawing Sheets

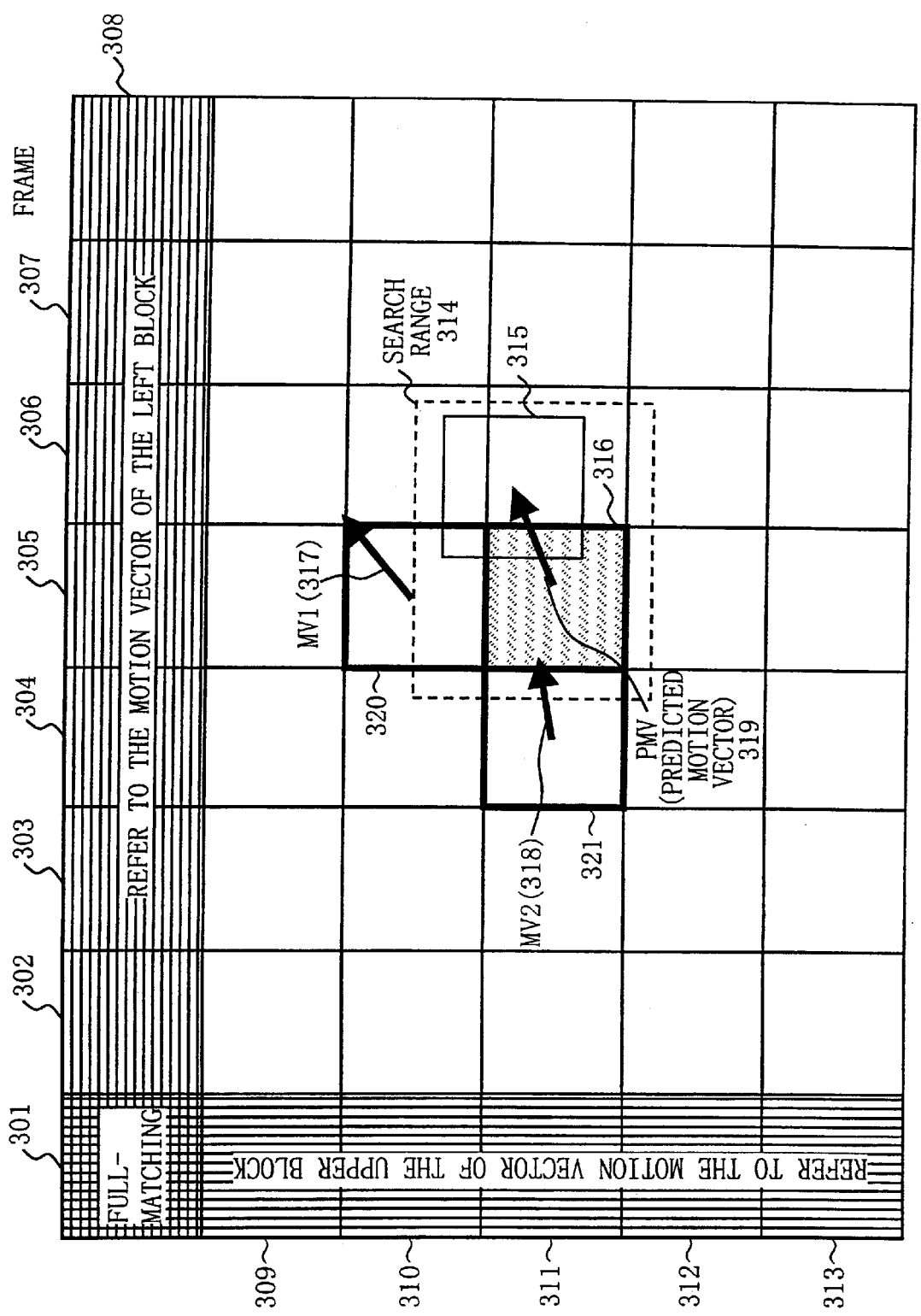

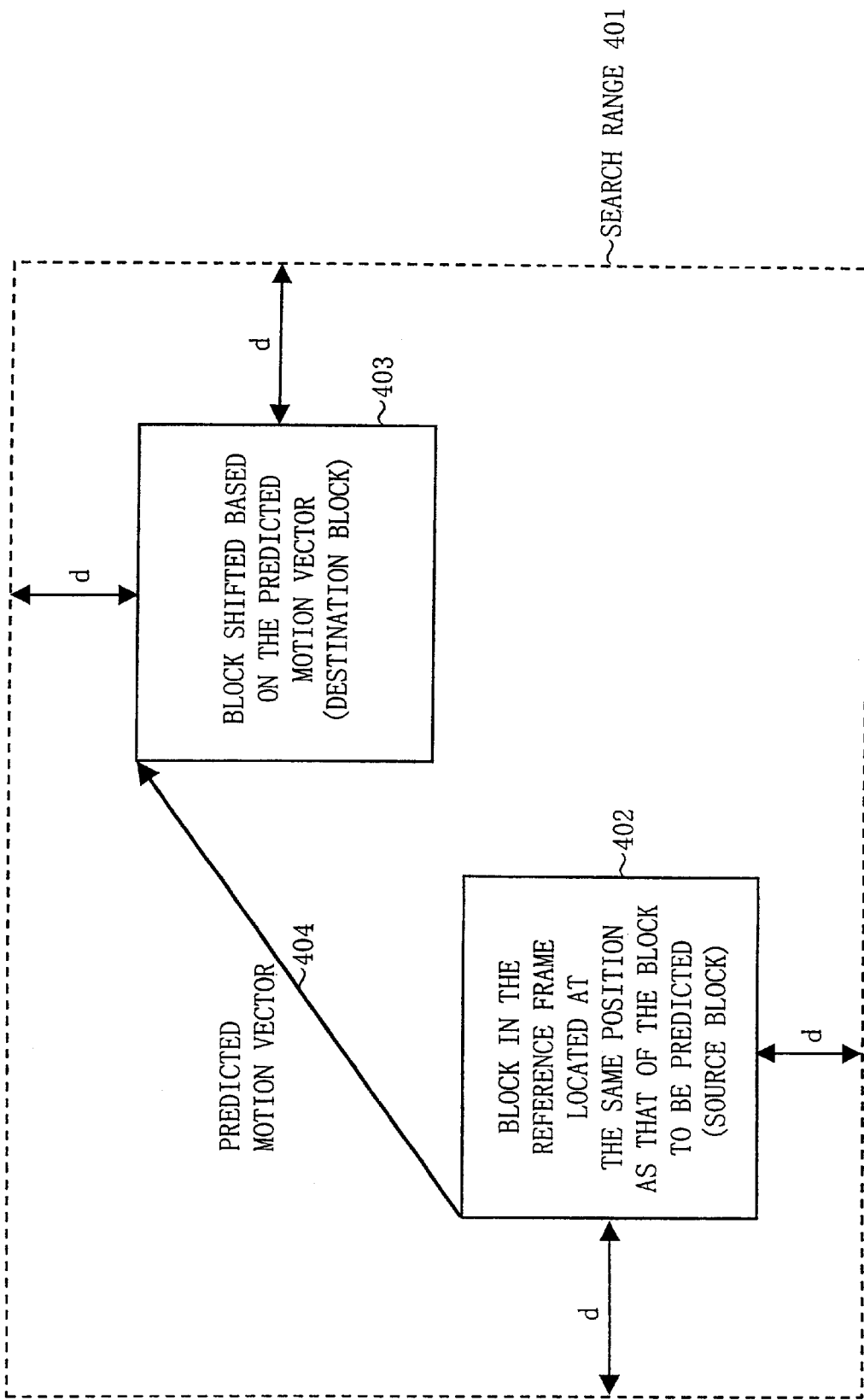

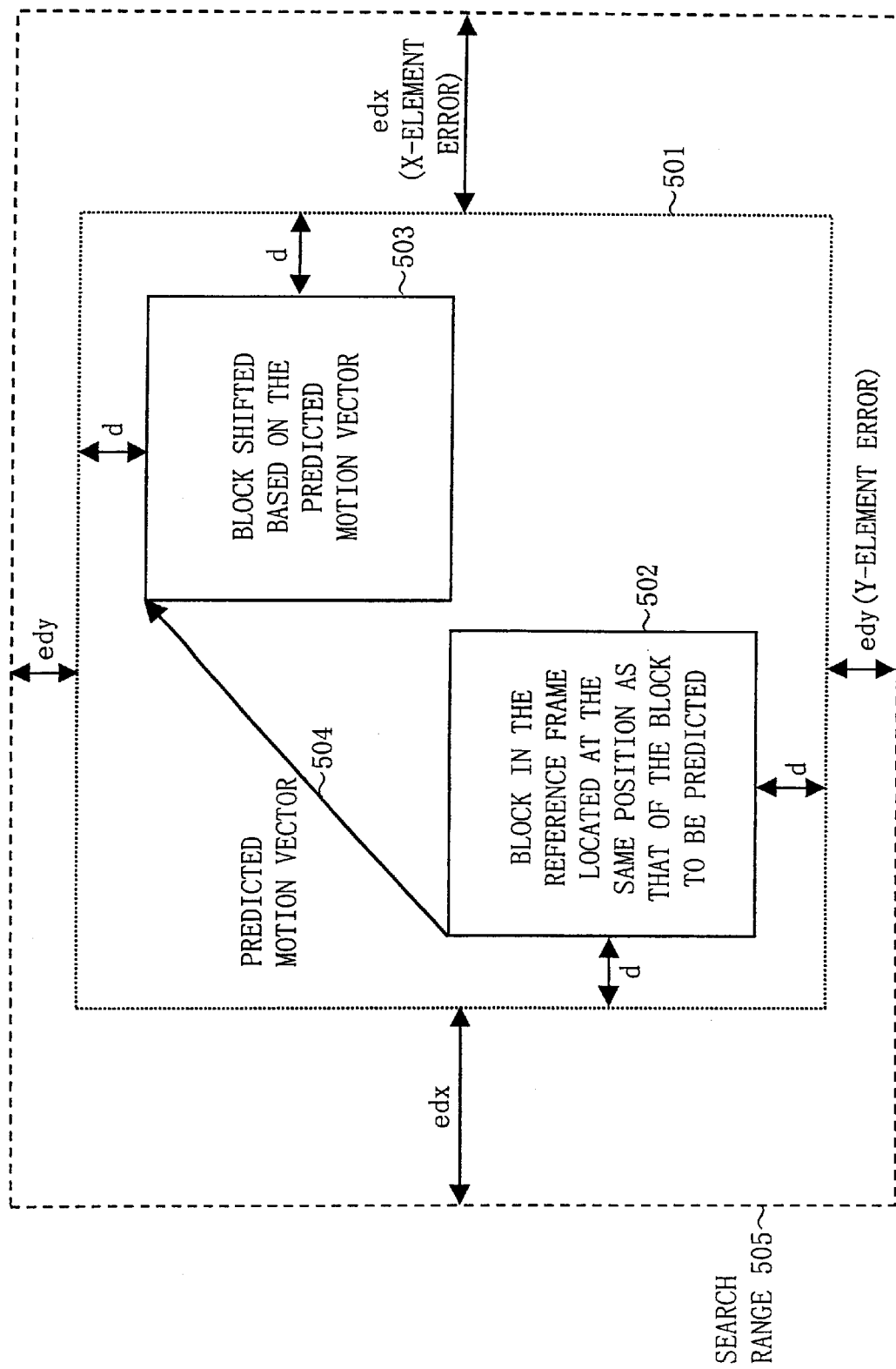

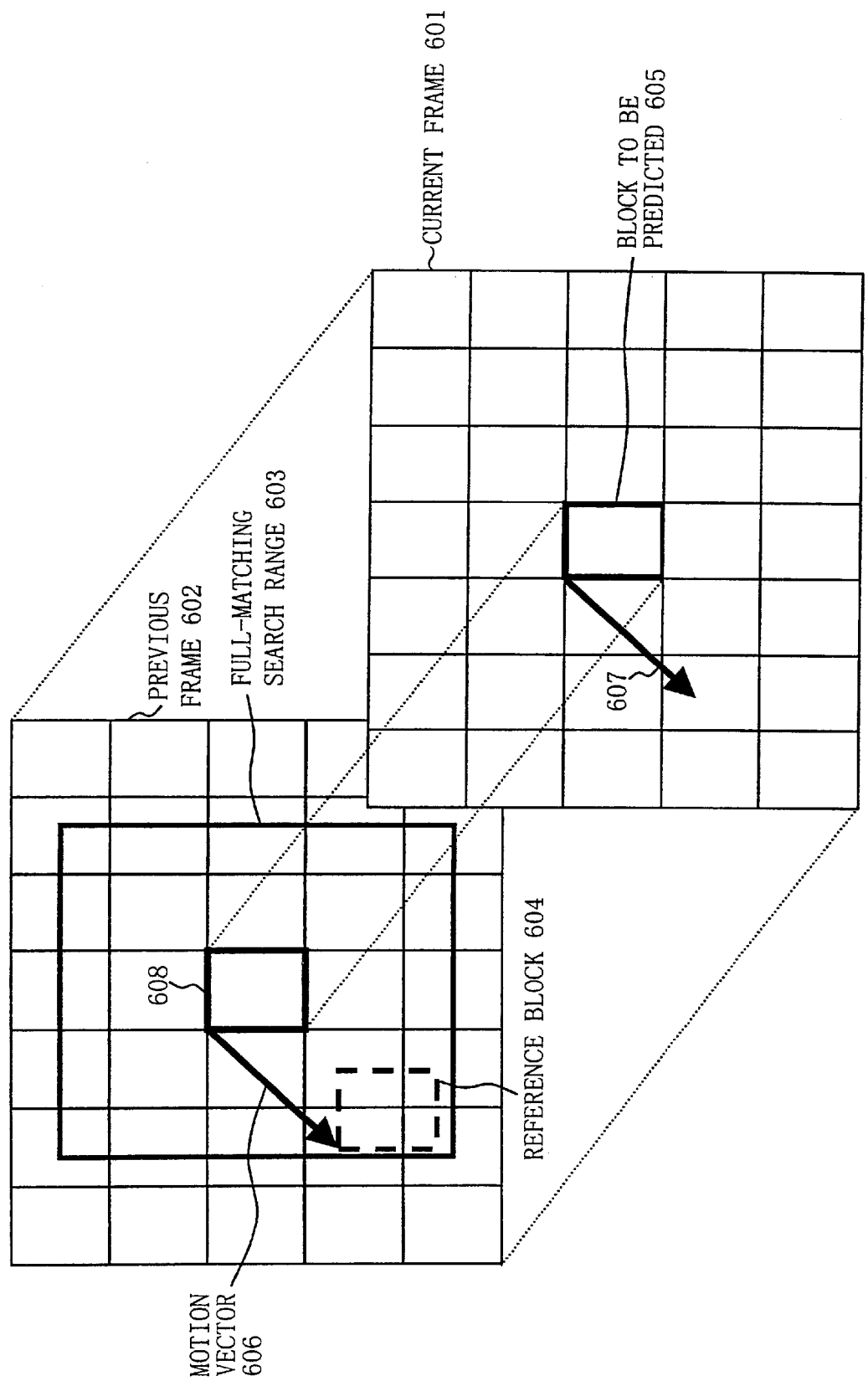

MOTION VECTOR DETECTION SYSTEM

This application is a continuation of International Application No. PCT/JP99/04063, filed on Jul. 29, 1999.

TECHNICAL FIELD

This system relates to a motion vector detection system which reduces the amount of operations for detecting a motion vector for motion compensation in moving picture compression with the quality of an image being maintained.

BACKGROUND OF THE INVENTION

As a method conventionally used for digitizing a moving picture and then compressing and encoding the digitized data, a picture frame is divided into mesh-type blocks to be subjected to a block based motion compensation, orthogonal transform such as Discrete Cosine Transform (hereinafter referred to as DCT), quantization and variable-length encodation.

For example, the above mentioned method is employed in such international standards as H.261 dealing with a camera-input signal of an existing television, MPEG-1 (Motion Picture Image Coding Experts Group) as an improvement of H.261 designed for dealing with storage media such as CD-ROM, MPEG-2 designed for dealing with communication/broadcasting media, and MPEG-4 designed for dealing with low bit rate data and multi-media data. Motion compensation employed in this method is designed for high image quality compression and encodation, such that motion vector detection is involved. A typical motion vector detection method is now discussed.

FIG. 6 shows a full-matching method for detecting a motion vector 607 of a block 605 to be predicted in a current frame 601 through block matching based upon the information of a previous frame 602 having been encoded. The motion vector of the block 605 to be predicted is detected through matching of the block 605 to be predicted and individual blocks within a search range 603 fixed surrounding a block 608 in the previous frame 602 located at an equivalent position to that of the block 605 to be predicted. The motion vector 606 is only allowed to express itself within a range of ±15 pixels, which provides, in a general sense, a range of 30+M pixels vertically (in length) and 30+N pixels horizontally (in breadth) with the block to be predicted at the center for searching the block, where M designates the vertical pixel size of the block and N designates the horizontal pixel size of the block. Each pixel based error of all or some of blocks within the search range for the block to be predicted from the block to be predicted is calculated sequentially to detect a block having a minimal error within the search range as a reference block 604 of the block to be predicted. Based upon the positions of the reference block 604 and the block to be predicted, the motion vector 607 of the block to be predicted is obtained.

The aforementioned method having all the blocks within the search range subjected to pixel based error calculation to determine the reference block is called the full-matching method, which is the most efficient approach of detecting a precise reference block. By detecting the reference block as precise as possible, a pixel based error between the block to be predicted and the reference block is minimized, which contributes to the prediction of the block to be predicted with a small amount of information. The full-matching method, however, involving a large amount of operations for detecting a motion vector, requires a large amount of processing time for motion compensation. Further, the full-matching method, with the search range being fixed, performs an inefficient searching in an unnecessarily large area for a block to be predicted whose motion is static. This may result in a failure in detecting an appropriate motion vector, which may degrade the quality of the image or increase in the amount of bits for encoding.

Among motion compensation methods other than the full-matching method, some approaches employ the same fixed search range as that of the full-matching method and reduce the amount of operations for motion vector detection more than that of the full-matching method through thinning the pixels of the reference frame and the block to be predicted at the same ratio, sub-sampling or the like. Those approaches achieving the amount of operations reduced still fail to detect an appropriate motion vector due to the fixed search range, which then causes to degrade the quality of an image or increase the amount of bits for encoding.

Another type of approach for motion compensation is disclosed in Japanese Unexamined Patent Publication No. 7-107484, Japanese Unexamined Patent Publication No. 8-9379, Japanese Unexamined Patent Publication No. 8-32969, Japanese Unexamined Patent Publication No. 9-55941, Japanese Unexamined Patent Publication No. 9-65339, and Japanese Unexamined Patent Publication No. 10-4554. According to this approach, the block to be predicted whose motion is assumedly static is assigned a smaller area of the search range and the block to be predicted whose motion is assumedly dynamic is assigned a larger area of the search range so that the motion vector is detected through an optimum amount of operations for the specific block to be subjected.

According to Japanese Unexamined Patent Publication No. 8-9379, for example, the vertical and horizontal sides of an initially set area of the search range is extended by the average of the absolute values of the motion vectors of blocks adjacent to the block to be predicted. This system, as the search range is allowed to be set in accordance with the magnitude of the motion of a block, the search range is extended by the same distance from the block to be predicted on all sides vertically and horizontally, so that the directional property of the motion is neglected. Consequently, in the case of the average of the absolute values of motion vectors being large, the amount of operations for detecting a motion vector becomes no less than that of the full-matching method, which makes the detection of an appropriate motion vector difficult.

As aforementioned, in pursuit of detecting a precise motion vector, if the search range is set to a fixed large area, then the amount of operations for detection becomes large. In particular, with a static moving picture, this is rather a waste of searching, and may result even, on the contrary, in a failure to detect an appropriate motion vector. Further, in the method where a motion vector is detected with the search range being varied, the search range is extended by the same distance on all sides vertically and horizontally based upon the average value, maximum value or the like of the absolute values of adjacent motion vectors. Consequently, if the average or maximum value is large, then the extension margin becomes large, thereby posing the same problem as that of the full-matching method.

SUMMARY OF THE INVENTION

The present invention overcomes the deficiencies of the prior art systems by providing a motion vector detection system and method having a motion vector detector for obtaining a motion vector of a block to be predicted in a frame subjected to prediction through block matching of the block to be predicted and a search block within a search range in a reference frame and a motion vector memory for storing the motion vector obtained in the motion vector detector being mapped onto a position of the block to be predicted. The motion vector detection system comprises a predicted motion vector calculator for retrieving individual motion vectors of a plurality of reference blocks adjacent to the position of the block to be predicted from the motion vector. The predicted motion vector calculator calculates a predicted motion vector predicting the motion vector of the block to be predicted based upon the individual motion vectors of the plurality of reference blocks retrieved. The motion vector detection system further comprises a search range determiner for determining the search range in the reference frame based upon the predicted motion vector.

Further scope of the applicability of the present invention will become apparent from the detailed description provided hereinafter. However, it should be understood that the detailed description and specific embodiments, while disclosing the preferred embodiments of the invention, are provided by way of illustration only and not limitation.

BRIEF DESCRIPTION OF THE DRAWINGS

FIG. 3 shows a diagram exemplifying predicted motion vectors calculated by a predicted motion vector calculator.

FIG. 4 shows a diagram exemplifying a search range determined by a search range determiner.

FIG. 5 shows a diagram exemplifying a search range extended by a search range extension unit.

FIG. 6 shows a diagram exemplifying a search range according to a conventional full-matching method.

DETAILED DESCRIPTION OF THE INVENTION

Figure 1:
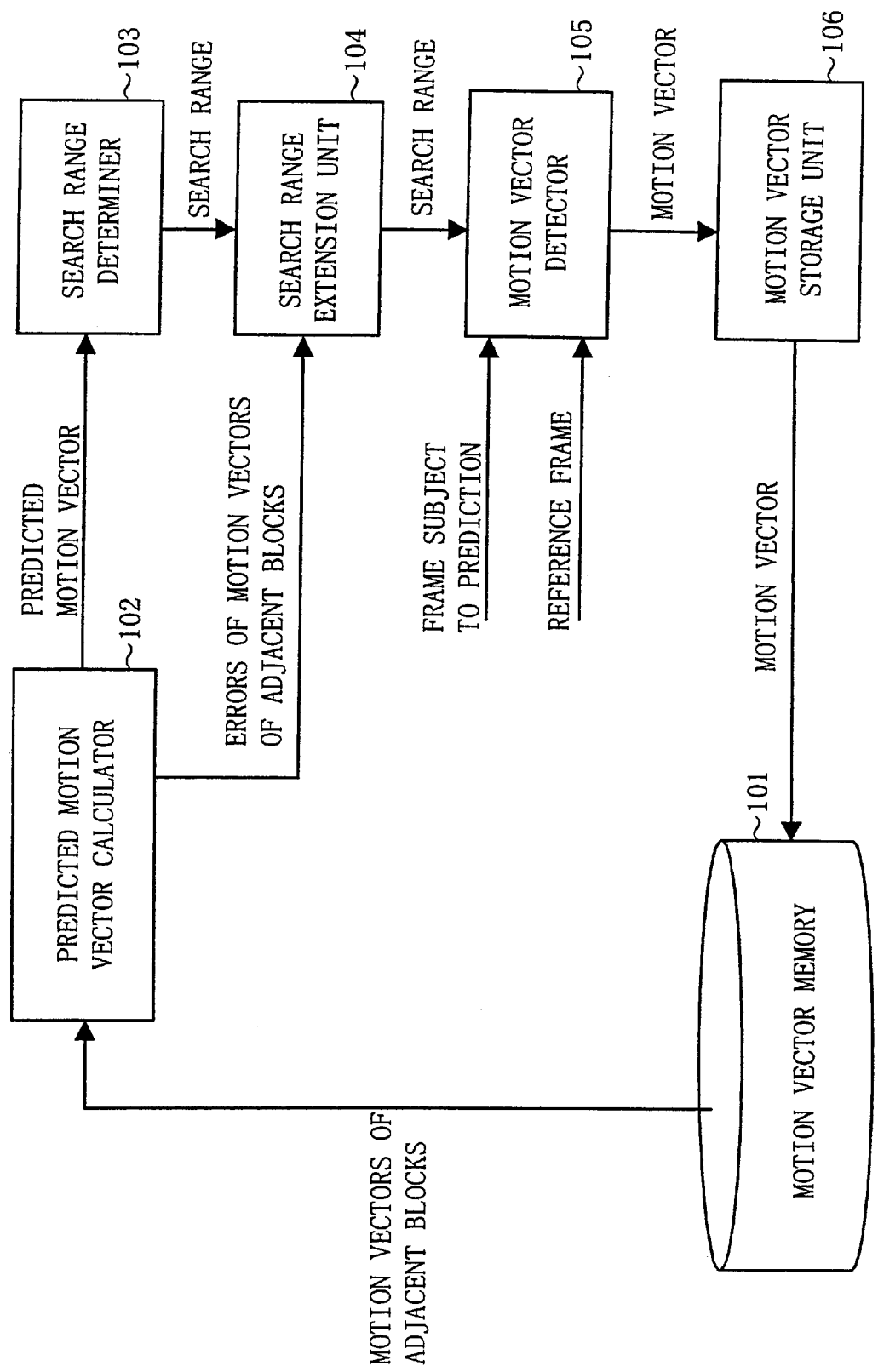
FIG. 1 shows a block diagram of a motion vector detection system.

FIG. 1 shows a block diagram of a motion vector detection system of the present invention. A method for detecting the motion vector of a block to be predicted is now discussed. Initially, a predicted motion vector detector 102 receives the motion vectors of blocks adjacent to the block to be predicted from a motion vector memory 101 and outputs the errors of the motion vectors and the predicted motion vector of the block to be predicted. The predicted motion vector predicts the motion vector of the block to be predicted. Then, a search range determiner 103 receiving the predicted motion vector determines and outputs a search range for the motion vector of the block to be predicted. A search range extension unit 104 receiving the search range and the errors of the motion vectors extends the search range inputted and outputs an extended search range. A motion vector detector 105 receiving the expanded search range obtains a motion vector through block matching based upon the pixel data of the block to be predicted and the pixel data of a reference frame and outputs an obtained motion vector. A block matching range in the reference frame is the search range inputted. A motion vector storage unit 106 stores the motion vector in an appropriate memory map. Individual blocks to be predicted are subject to the foregoing operating flow.

Figure 2:
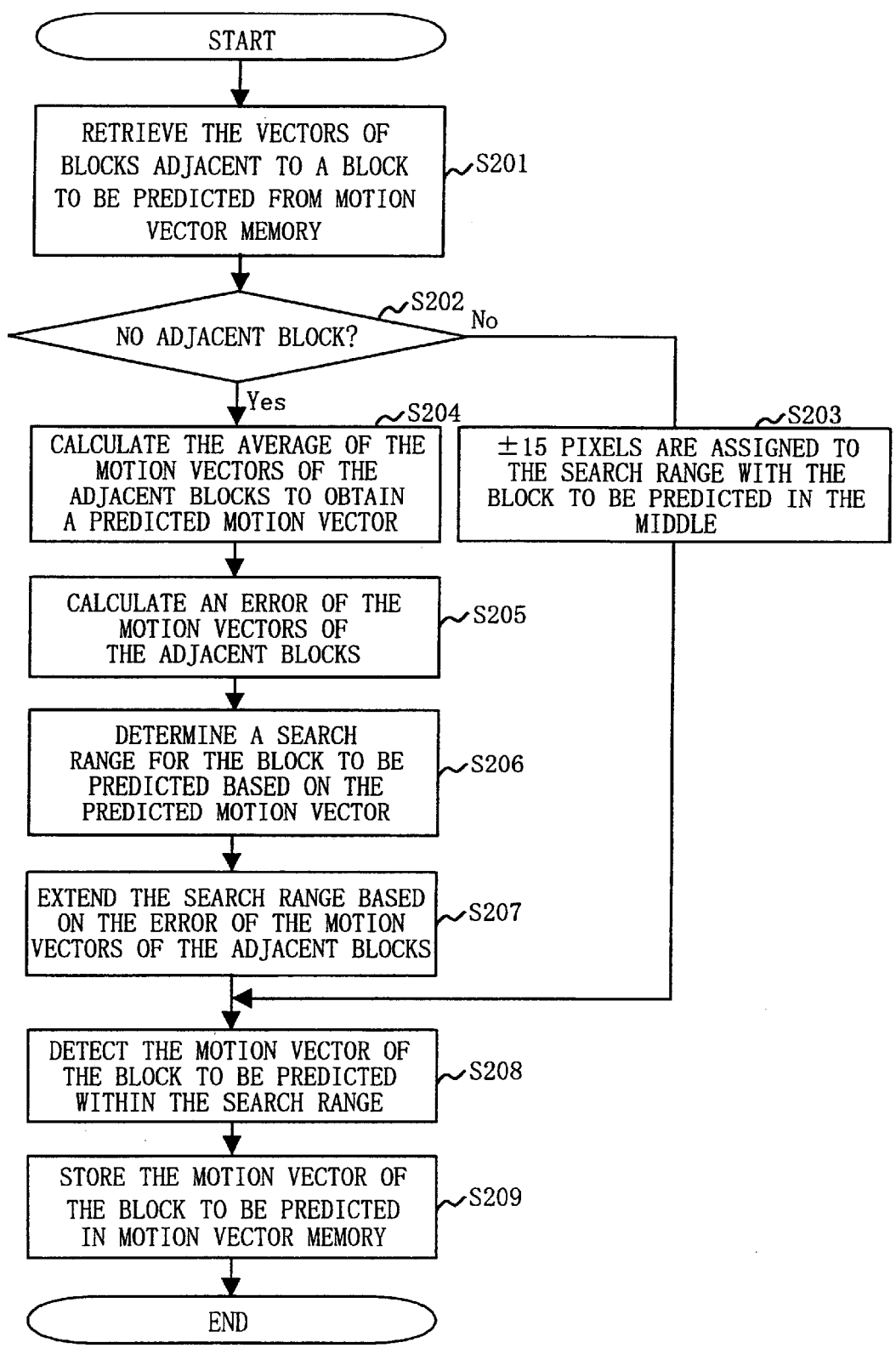
FIG. 2 shows a flow chart of the motion vector detection system.

FIG. 2 shows a flow chart illustrating a whole course of operation for detecting the motion vector of the block to be predicted.

FIG. 3 shows a frame exemplifying a predicted motion vector 319 and a motion vector error calculated by the predicted motion vector calculator. Initially, already detected motion vectors 317 and 318, respectively, of blocks 320 and 321 adjacent to a block 316 to be predicted are obtained from the motion vector memory. According to this example, blocks are selected sequentially to be predicted each from the top left of the frame to the right. A block whose motion vector has been obtained is allowed to be used as a reference block. According to this example, blocks at the left side and at the upper side of the block to be predicted are used as the reference blocks. Alternatively, blocks at the upper left and the upper right may also be used as the reference blocks. In FIG. 3, when the motion vector 317 of the upper block is represented by MV1 and the motion vector 318 of the left block is represented by MV2, a predicted motion vector PMV of the block to be predicted is the average of MV1 and MV2. Specifically, when MV1=(X1,Y1) and MV2=(X2,Y2) are given, PMV=(PX, PY) is expressed by substituting PX=(X1+X2)/2 and PY=(Y1+Y2)/2. Other than the arithmetic mean approach, it is also effective to use a function involving the directional property of the motion vector of the reference block for obtaining the predicted motion vector. It is particularly desirable to have an approach of obtaining the predicted motion vector based upon the tendency of the directional property of the motion vector. For example, various kinds of average such as the geometric mean and the harmonic mean may be utilized on an element basis.

When the block to be predicted has no reference block (i.e. when having no adjacent block whose predicted motion vector has been detected in such a case as a block 301 at the top left of FIG. 3 is selected to be predicted), then no detection is performed of the predicted motion vector, and instead, the search range determiner utilizes the full-matching method. When blocks 302 through 308 in the first row of the frame of FIG. 3 are to be predicted, the respective blocks have their single adjacent blocks whose motion vectors have been detected only at the left side. When blocks 309 through 313 in the first column are to be predicted, the respective blocks have their single adjacent blocks whose motion vectors have been detected only at the upper side. In those cases, the motion vector of the single adjacent block is designated as the predicted motion vector of the block to be predicted.

As aforementioned, by calculating the predicted motion vector, the motion vector of the block to be predicted is obtained based upon the tendency of the motion vectors of adjacent blocks. Further, in use of this predicted motion vector, the area of the search range and the directional property can be predicted in an accurate manner. Consequently, the block based accurate determination of the search range allows a reduced amount of operations for motion vector detection.

When the reference block is of an intra-block (i.e. when the reference block is not of a block obtained through prediction but of a block obtained through encoding the pixel value of the block), although the motion vector of the reference block can conventionally be used, it is possible and effective to consider the motion vector a zero vector or no motion vector. With the intra-block, it is indicated that the quality of an image appeared poor through prediction after detecting a motion vector or an amount of bits for encoding became too large as a result of prediction. Accordingly, it can be assumed that the motion vector of the intra-block has weak correlation with the block to be predicted. Hence, treating the motion vector of the intra-block as a zero vector or a detection failure may avoid wasteful efforts to detect a motion vector or detecting an inappropriate motion vector.

When there are two or more adjacent blocks whose motion vectors have been detected, namely, reference blocks, the errors of the motion vectors of the respective reference blocks are calculated. Referring to FIG. 3, the X-axis error of the motion vector is represented by X1–X2 and the Y-axis error of the motion vector is represented by Y1–Y2 . Consequently, in the case of N number of the reference blocks existed, the X-axis error of the motion vector is MIN (X1, X2, . . . , XN)–MAX (X1, X2, . . . , XN) and the Y-axis error of the motion vector is MIN (Y1, Y2, YN)–MAX (Y1, Y2, . . . , YN) , where MIN denotes a minimal value of arguments and MAX denotes a maximal value of arguments.

The predicted motion vector is outputted to the search range determiner 103. An error between the motion vectors of adjacent blocks is outputted to the search range extension unit 104.

FIG. 4 shows an example of the search range determined by the search range determiner. The search range determiner, receiving a predicted motion vector 404 detected by the predicted motion vector detector 102, determines a search range 401 for the motion vector of the block to be predicted to be an area obtained by extending a rectangle including a block 402 locating at the same position as that of the block to be predicted and a block 403 obtained by shifting the block 402 based upon the predicted motion vector in the reference frame on every side by d vertically and horizontally. Some encoding systems such as MPEG, in pursuit of an efficient transmission of a motion-less picture, employ a system where information identifying the type of motion, static or dynamic, is transmitted on a block basis for transmitting a motion vector only with a dynamic block. According to another system also employed, if the motion vector is a zero vector and the prediction error is zero, then the block is not subjected to encodation. In those encoding systems, it is advantageous for reducing an overall amount of bits for encoding to select a zero vector rather than a larger motion vector if the prediction error is similarly small. Hence, this type of encoding system requires a zero-vector prioritized motion vector detection. It is effective, therefore, for detecting a zero vector prioritized to include the neighborhood of the position of the block to be predicted as well as the neighborhood of the predicted motion vector in the search range in the search range determiner 103. Further, the amount of operations for detecting a motion vector can be reduced by extending the search range in the direction of the predicted motion vector rather than on all sides vertically and horizontally by the same length from the block to be predicted, which at the same time contributes to preventing an erroneous and inappropriate motion vector from being detected.

The length of d is to be controlled so that the horizontal or vertical length of the search range does not exceed 15+L where L designates the horizontal or vertical length of a block. When no predicted motion vector is detected, i.e. when the top left block is the block to be predicted in FIG. 3, the search range is an area obtained by extending 15 vertically and horizontally from the block to be predicted. The search range is outputted to the search range extension unit.

FIG. 5 shows an example of the search range extended by the search range extension unit. When the X-axis and Y-axis errors of the motion vector of an adjacent block calculated in the motion vector detector 102 are edx and edy, respectively, a search range 501 determined by the search range determiner is extended by edx on the X-axis and edy on the Y-axis. The length of edx or edy has to be controlled so that the horizontal or vertical length, respectively, of an extended search range 505 does not exceed 15+L. It is also effective to multiply edx and edy by a given value (e.g. a decimal value over zero) each to obtain an X-axis extension margin and a Y-axis extension margin. The given value for multiplication may be different from each other.

The value of an error between the motion vectors of adjacent blocks can show the correlation between the adjacent blocks. Specifically, it can be said that in the case that an error between the motion vectors of adjacent blocks is large, then the adjacent blocks have weak correlation with each other, and in the case that an error between the motion vectors of adjacent blocks is small, then the adjacent blocks have strong correlation with each other. In addition to that, it can be assumed that in the case that a block has weak correlation with an adjacent block, then the block has weak correlation with a block to be predicted as well, and in the case that a block has strong correlation with an adjacent block, then the block has strong correlation with a block to be predicted as well. For that reason, in the case that the correlation can be assumed weak between a block and a block to be predicted, then the search range may be extended. This allows for ease in detecting an appropriate motion vector. The motion vector detector 102 determines a block having a minimal sum of pixel based errors with the block to be predicted through block matching within the search range determined by the search range extension unit 104. The motion vector of the block to be predicted is detected based upon the position of the block determined and the position of the block to be predicted.

The motion vector storage unit 106 stores the motion vector detected by the motion vector detector in the motion vector memory 101. Any storable medium may be employed as the motion vector memory. The motion memory may be so small in size as to store the motion vectors of a row of blocks. The motion vector detection is performed on a row basis from the top left block in the frame. Accordingly, having at least only one motion vector stored of a block among blocks in each column, the motion vector of a block adjacent to the block to be predicted can be obtained.

In the case that a motion vector is detected through a multi-step approach involving various pixel units such as a sub-sampling-pixel unit, an integer-pixel unit and a half-pixel unit, or that the motion vectors of a sequence of blocks are detected in an asynchronous manner, the various pixel units are to be unified for storage to update a memory area allocated to the block with a current motion vector. Consequently, the size of the memory can be minimized so as to store the motion vectors of a row of blocks.

An effect of the motion vector detection system of this invention is the precise prediction of the area of the search range and the directional property for obtaining the motion vector of the block to be predicted made possible through calculating the predicted motion vector based upon the motion vector of a block adjacent to the block to be predicted. Thus, the block based accurate determination of the search range produces the advantage of reducing the amount of operations for detecting a motion vector.

Further, the employment of the average of the respective motion vectors of the embodiment achieves the accurate prediction based upon the tendency of the respective motion vectors.

Furthermore, the search range determiner determining that the search range includes the neighborhood of the position of the block to be predicted as well as the neighborhood of the predicted motion vector of the embodiment achieves an effective processing of the zero-vector prioritized detection.

Still further, the search range extension unit extending the search range in the case of the correlation assumedly weak between the block to be predicted and the reference block of the embodiment contributes to detecting an appropriate motion vector.

What is claimed is:

1. A motion vector detection system having a motion vector detector for obtaining a motion vector of a block to be predicted in a frame subjected to prediction through block matching of the block to be predicted and a search block within a search range in a reference frame, and a motion vector memory for storing the motion vector obtained in the motion vector detector being mapped onto a position of the block to be predicted, the motion vector detection system comprising:

a predicted motion vector calculator for retrieving individual motion vectors of a plurality of reference blocks adjacent to the position of the block to be predicted from the motion vector memory and calculating a predicted motion vector predicting the motion vector of the block to be predicted based upon the individual motion vectors of the plurality of reference blocks retrieved; and a search range determiner for determining the search range in the reference frame based upon the predicted motion vector.

2. The motion vector detection system of claim 1, wherein the predicted motion vector calculator calculates an averaged vector of the individual motion vectors of the plurality of reference blocks as the predicted motion vector.

3. The motion vector detection system of claim 1, wherein the search range determiner determines the search range to be an area including a source block whose position in the reference frame is equal to the position of the block to be predicted and a destination block whose position in the reference frame is obtained by shifting the position of the source block based upon the predicted motion vector.

4. The motion vector detection system of claim 3, wherein the search range determiner determines the search range to be an area obtained by adding a predetermined margin to a minimal rectangle including the source block and the destination block.

5. The motion vector detection system of claim 1, wherein the predicted motion vector calculator calculates a motion vector error representing a prediction error of the predicted motion vector based upon the individual motion vectors of the plurality of reference blocks, and wherein the motion vector detection system further includes, a search range extension unit for extending the search range based upon the motion vector error.

6. The motion vector detection system of claim 5, wherein the predicted motion vector calculator, when the individual motion vectors of the plurality of reference blocks being represented each by two orthogonal elements of an X element and a Y element, calculates the motion vector error composed of an X-element error representing an absolute value of a maximum difference between individual X elements and a Y-element error representing an absolute value of a maximum difference between individual Y elements.

7. The motion vector detection system of claim 6, wherein the search range extension unit extends the search range by an X-axis extension margin obtained by multiplying the X-element error by a predetermined value in an X-axis positive direction and an X-axis negative direction and extends the search range also by a Y-axis extension margin obtained by multiplying the Y-element error by the predetermined value in a Y-axis positive direction and a Y-axis negative direction.

8. A method of motion vector detection in a motion vector detection system having a motion vector detector for obtaining a motion vector of a block to be predicted in a frame subjected to prediction through block matching of the block to be predicted and a search block within a search range in a reference frame, and a motion vector memory for storing the motion vector obtained in the motion vector detector being mapped onto a position of the block to be predicted, the method comprising:

providing a predicted motion vector calculator that retrieves individual motion vectors of a plurality of reference blocks adjacent to the position of the block to be predicted from the motion vector;

calculating a predicted motion vector;

predicting the motion vector of the block to be predicted based upon the individual motion vectors of the plurality of reference blocks retrieved; and determining a search range determiner for the search range in the reference frame based upon the predicted motion vector.

9. The method of claim 8, wherein the predicted motion vector calculator calculates an average vector of the individual motion vectors of the plurality of reference blocks as the predicted motion vector.

10. The method of claim 8, wherein the search range determiner determines the search range to be an area including a source block whose position in the reference frame is equal to the position of the block to be predicted and a destination block whose position in the reference frame is obtained by shifting the position of the source block based on the predicted motion vector.

11. The method of claim 10, wherein the search range determiner determines the search range to be an area obtained by adding a predetermined margin to a minimal rectangle including the source block and the destination block.

12. The method of claim 8, further comprising:

calculating a motion vector error representing a predicted error of the predicted motion vector based upon the individual motion vectors of the plurality of reference blocks; and extending the search range by a search range extension unit based upon the motion vector error.

13. The method of claim 12, wherein the predicted motion vector calculator, when the individual motion vectors of the plurality of reference blocks being represented each by two orthogonal elements of an X element and a Y element, calculates the motion vector error comprising an X-element error representing an absolute value of a maximum difference between individual X elements and a Y-element error representing an absolute value of a maximum difference between individual Y elements.

14. The method of claim 13, wherein the search range extension unit extends the search range by an X-axis extension margin obtained by multiplying the X-element error by a predetermined value in an X-axis positive direction and an X-axis negative direction and extends the search range also by a Y-axis extension margin obtained by multiplying the Y-element in a Y-axis positive direction and a Y-axis negative direction.

* * * * *